(12) United States Patent
Kumar et al.

(10) Patent No.: US 11,874,851 B2
(45) Date of Patent: Jan. 16, 2024

(54) CONTEXTUAL REPLICATION PROFILE CREATION BASED ON DATA CRITICALITY

(71) Applicant: EMC IP Holding Company LLC, Hopkinton, MA (US)

(72) Inventors: Suren Kumar, Bangalore (IN); Vinod Durairaj, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/355,541

(22) Filed: Jun. 23, 2021

(65) Prior Publication Data
US 2022/0382780 A1    Dec. 1, 2022

(51) Int. Cl.
*G06F 16/30*    (2019.01)
*G06F 16/27*    (2019.01)
*G06N 20/00*    (2019.01)

(52) U.S. Cl.
CPC ............. *G06F 16/27* (2019.01); *G06N 20/00* (2019.01)

(58) Field of Classification Search
CPC ....................................................... G06F 16/27
See application file for complete search history.

(56) References Cited

U.S. PATENT DOCUMENTS

| | | | |
|---|---|---|---|
| 7,509,468 B1 * | 3/2009 | Dalal | G06F 21/562 |
| | | | 711/163 |
| 2012/0151164 A1 * | 6/2012 | Nayak | G06F 11/2094 |
| | | | 711/E12.001 |
| 2013/0041869 A1 * | 2/2013 | Newport | G06F 16/273 |
| | | | 707/613 |
| 2020/0159841 A1 * | 5/2020 | Tabares | G06F 16/1805 |
| 2020/0348842 A1 * | 11/2020 | Meadowcroft | G06F 9/45558 |
| 2020/0348980 A1 * | 11/2020 | Meiri | G06F 9/5061 |
| 2021/0241131 A1 * | 8/2021 | Khawas | G06N 20/20 |
| 2021/0382797 A1 * | 12/2021 | Tatiparthi | G06F 9/45558 |

* cited by examiner

*Primary Examiner* — Khanh B Pham
(74) *Attorney, Agent, or Firm* — Staniford Tomita LLP

(57) ABSTRACT

Embodiments for providing end-to-end automated contextual and differentiated application level replication by dynamically creating replication profiles for asynchronous or synchronous replication at runtime to maintain any relevant service level agreement requirements. Based on relevant operating information, data sources are identified as critical and non-critical servers and their data is tagged accordingly in the replication application by using an analytics engine. The information and tags are used to produce a trained model for machine learning processes that can generated predictions for future replication operations. An error handler identifies erroneous predictions and provides a fallback mechanism to avoid any customer replication service level agreement breach at any given time.

20 Claims, 8 Drawing Sheets

| DATA ATTRIBUTE | HOW DATA IS COLLECTED | NOTES |
|---|---|---|
| Production and Non-Production Servers | Source and Target are identified by tracing IP ranges of Servers Using IP commands | In the datacenter, production vs non-production are maintained in different network subnet IP range. E.g., servers from 192.168.xx.xx to 192.220.xx.xx are production and rests are non-production |
| Data Type | Identified using the regex pattern, file extension and other methodologies | Based on the installed applications in the server, could be one of key data attributes |
| Tenants and Projects Cloud Environment | Data is collected by making REST/SOAP API call to the cloud | Cloud Admin in datacenter categorizes projects that are critical and non-critical in Tenants |
| Storage Location Device Capabilities | Data is collected by making REST/SOAP API call to the cloud | In a cloud environment, there are capabilities and tiering categorized as Platinum, Gold, Silver, Bronze, etc. VMs that are in tiers are considered to derive criticality |
| VM Priority Attribute in Virtualization Environment | vSphere API, Ovirt API, powercli commands | In a virtualized environment the VM priority attributes are collected for replication priority by proposed intelligence |

FIG. 6

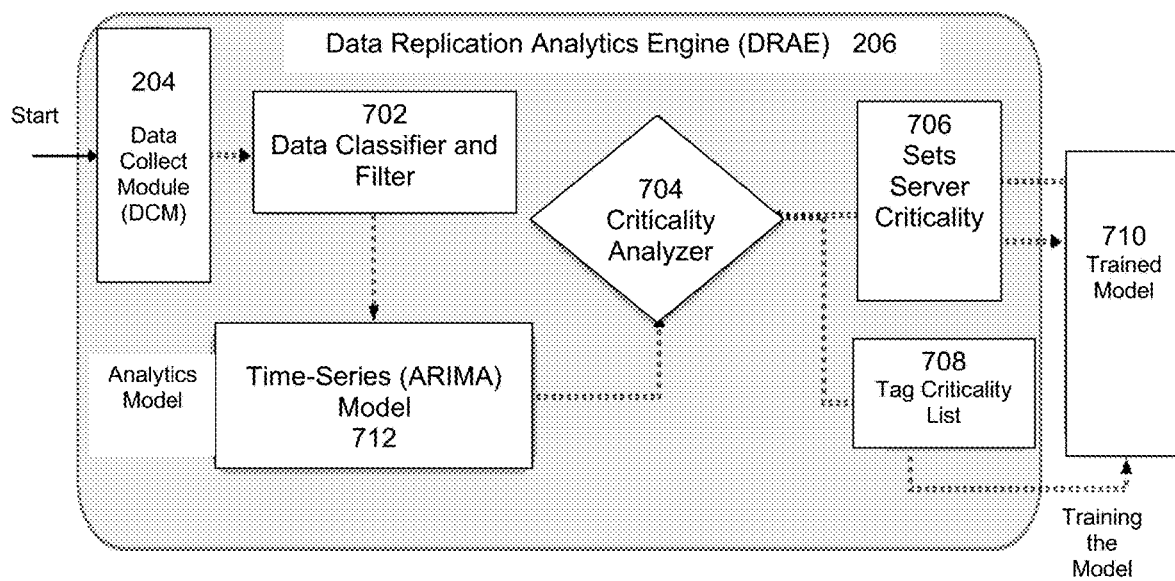

CONTEXTUAL REPLICATION PROFILE CREATION BASED ON DATA CRITICALITY

CROSS-REFERENCE TO RELATED APPLICATIONS

The present application is claims priority to Indian Patent Application No. 202111023667 filed on May 27, 2021, entitled "Contextual Replication Profile Creation Based on Data Criticality," and assigned to the assignee of the present application.

TECHNICAL FIELD

Embodiments are generally directed to data backup and replication systems, and more specifically to providing consistent, differentiated application-level replication.

BACKGROUND

Data protection comprising backup and recovery software products are crucial for enterprise-level network clients. Customers rely on backup systems to efficiently back up and recover data in the event of user error, data loss, system outages, hardware failure, or other catastrophic events to allow business applications to remain in service or quickly come back up to service after a failure condition or an outage. One form of data protection is data replication, in which the same data is stored in multiple different locations to improve data availability and reliability.

In present large-scale network backup systems, a replication system administrator must manually identify the criticality of the data based on the business requirements and select an appropriate replication type (e.g., asynchronous, synchronous) by creating the replication policy in a replication management console. This is very challenging in a large datacenter environment since the recovery time objective (RTO) and recovery point objective (RPO) could be dynamically changing based on real-time data, and the need for the datacenter administrator to manually modify the policies accordingly.

There is currently no way to provide consistent differentiated application-level replication based on the criticality of the application data. There is thus no intelligence to identify and tag the criticality of the data and dynamically create and modify the replication policies in the virtualization replication environment.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. DellEMC, NetWorker, Data Domain, Data Domain Restorer, and PowerProtect Data Manager (PPDM) are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 6 is an example table listing certain data classified information for deriving data criticality under some embodiments.

FIG. 7 illustrates a flow process for the analytics engine, under some embodiments.

DETAILED DESCRIPTION

Figure 1:
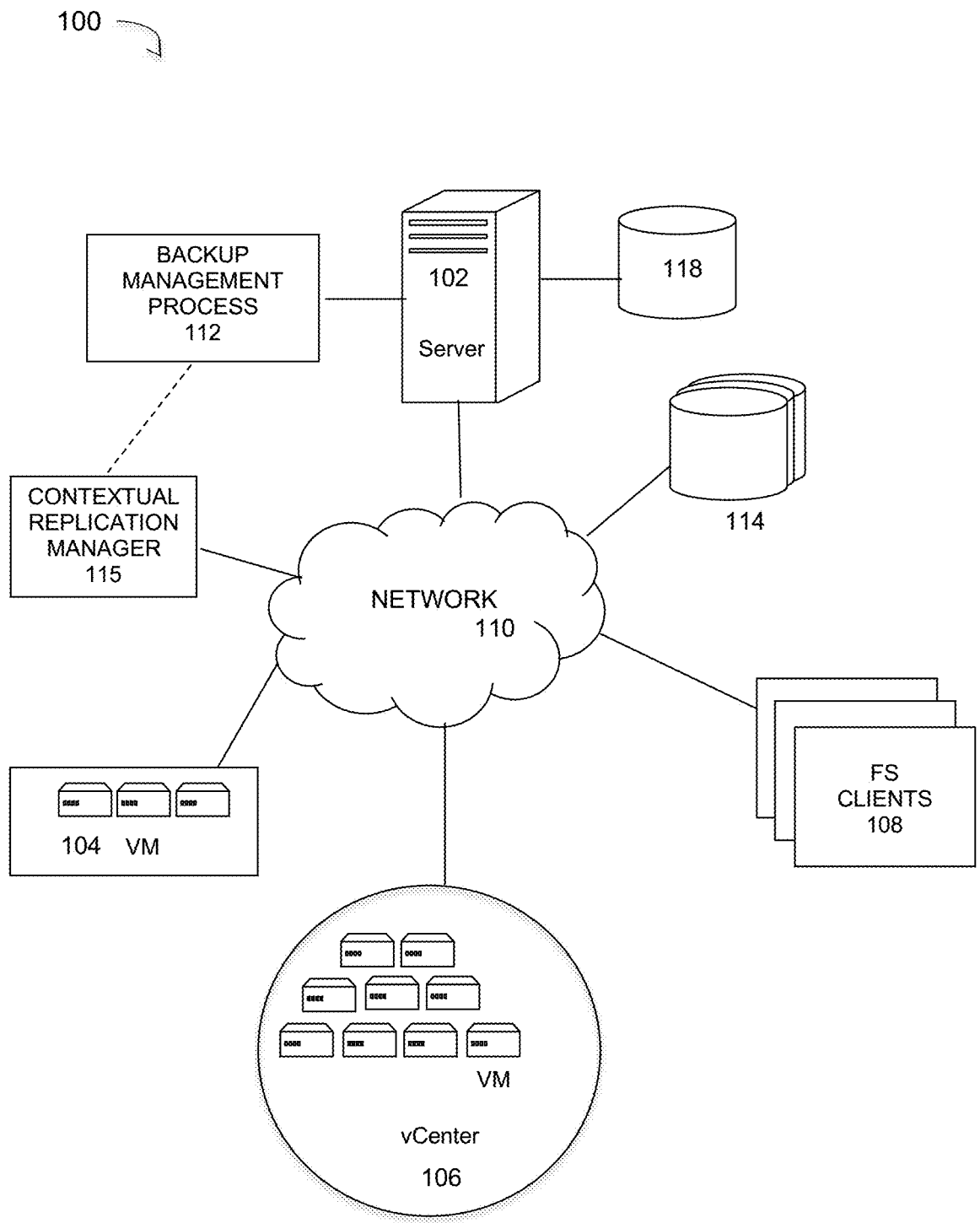
FIG. 1 is a diagram of a large-scale data backup system implementing a consistent, differentiated application-level replication service, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. The computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

A network server computer 102 is coupled directly or indirectly to the target VMs 106, and to the data sources 108 and 109 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform.

The data sourced by system 100 may be stored in any number of other storage locations and devices, such as local client storage, server storage (e.g., 118), or network storage (e.g., 114), which may at least be partially implemented through storage device arrays, such as RAID components. In an embodiment, network storage 114 and even server storage 118 may be embodied as iSCSI (or similar) disks that provide dynamic disk storage. In an embodiment, the storage devices 114 represent NAS devices or appliances, but other types of storage architectures may also be used, such as storage area network (SAN) or any other protocol that makes use of large-scale network accessible storage devices 114, such as large capacity disk (optical or magnetic) arrays.

FIG. 1 illustrates a computer network system 100 that implements one or more embodiments of a contextual replication manager system for data storage environments, under some embodiments. System 100 represents a network backup and storage system that can backup data from one or more data sources to one or more different storage media domains, such as a physical disk storage domains and virtual hard disk (VHD) domains. Embodiments provide an end-to-end automated intelligence to identify the criticality of server and create the appropriate replication profile for servers in the datacenter. An analytics engine identifies the criticality of the data/VM/server and categorizes the servers into critical and non-critical, or other similar categories. Such embodiments provide marked improvement over present systems that rely on asynchronous and synchronous replication using manual methods.

Embodiments can be used in a physical storage environment, a virtual storage environment, or a mix of both, running a deduplicated backup program. In an embodiment, system 100 includes a number of virtual machines (VMs) or groups of VMs that are provided to serve as backup targets. Such target VMs may be organized into one or more vCenters (virtual centers) 106 representing a physical or virtual network of many virtual machines (VMs), such as on the order of thousands of VMs each. The VMs serve as target storage devices for data backed up from one or more data sources, such as file system (FS) clients 108. Other data sources having data to be protected and backed up may include other VMs 104 and data in network storage 114. The data sourced by the data source may be any appropriate type of data, such as database data that is part of a database management system. In this case, the data may reside on one or more storage devices of the system, and may be stored in the database in a variety of formats.

The data may also be categorized with different degrees of importance or 'criticality' with respect to the application of different backup, replication, or restoration policies, given the limited resources and costs of data processing in most data environments. For example, sensitive or mission critical data may be replicated and restored under highest priority policies to ensure that such data is adequately protected and readily available in case of system failure, while routine or easily reproducible data may be stored with lower priority policies.

For the embodiment of FIG. 1, network system 100 includes a server 102 that functions as a backup server by executing a backup management process 112 that automates the backup of network data using the target VM devices or the network storage devices 114. In an embodiment, the backup process 112 uses certain known full and incremental (or differencing) backup techniques along with a snapshot backup process that is used to store an image or images of the system(s) to be backed up prior to the full or incremental backup operations.

In an embodiment, the network system of FIG. 1 may be implemented as a DellEMC PowerProtect Data Manager (or similar) data protection system. This is an enterprise-level data protection software platform that automates data backups to tape, disk, and flash-based storage media across physical and virtual environments. A number of different operating systems (e.g., Windows, MacOS, Linux, etc.) are supported through cross-platform supports. Deduplication of backup data is provided by integration with systems such as DellEMC Data Domain and other similar storage solutions. Thus, server 102 may be implemented as a DDR Deduplication Storage server provided by DellEMC Corporation. However, other similar backup and storage systems are also possible. In a general implementation, a number of different users (or subscribers) may use backup management process 112 to back up their data on a regular basis to virtual or physical storage media for purposes of data protection. The saved datasets can then be used in data restore operations to restore any data that may be lost or compromised due to system failure or attack.

As shown in FIG. 1, system 100 includes a contextual replication manager component 115 that identifies the criticality of different servers and data sources and creates the appropriate replication profile for servers in the system or datacenter (e.g., 106). This manager component 115 includes several sub-components or processes that identify and categorize servers on the basis of their relative criticality to modify replication policies executed by backup server 102 or other data storage servers. The contextual replication manager 115 may be implemented as a network 110 or cloud-based process, or it may be associated with or integrated in the backup management process 112 or as a component within server 102.

Figure 2:
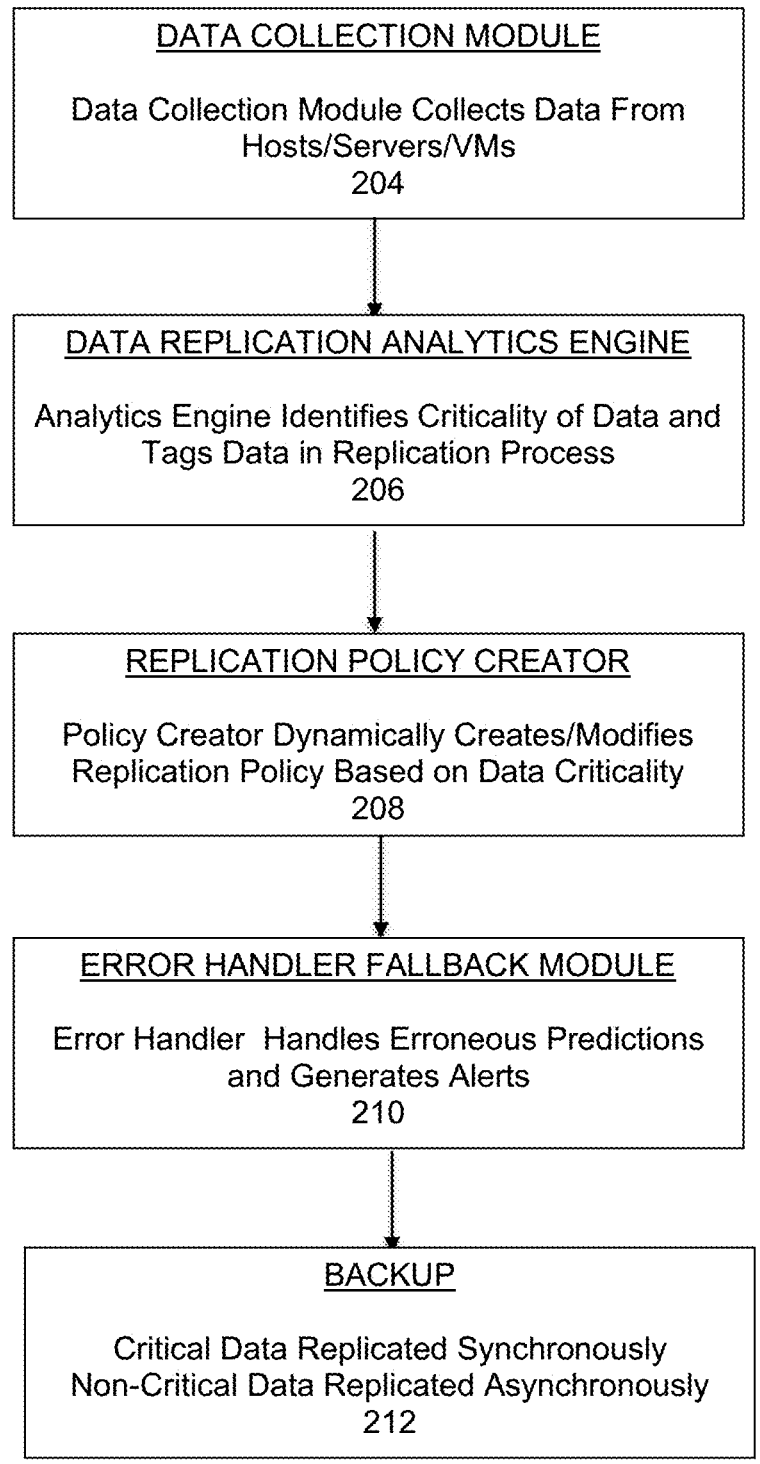
FIG. 2 is a diagram that illustrates an overall process of creating contextual replication profiles based on data criticality, under some embodiments.

FIG. 2 is a combination block diagram and flowchart 200 that illustrates an overall process of creating contextual replication profiles based on data criticality, under some embodiments. The main processing components of contextual replication manager 115 as shown in FIG. 2 are a data collection module (DCM) 204, a data replication analytics engine (DRAE) 206, a dynamic replication policy creator (DRPC) 208, and an error handler and fallback module 210.

As an overall process, the DCM 204 collects data from the data sources, such as hosts, servers, VMs, and so on. The DRAE 206 identifies the criticality of the collected data and tags the data accordingly. The data may be classified as a binary value, such as critical or non-critical, or in any appropriate higher-order classification, such as non-critical/ medium/very critical, low/medium/high, and so on. The DRPC 208 dynamically creates or modifies one or more replication policies for the collected data based on the tagged data criticality. The error handler and fallback module 210 handles any erroneous predictions and generates alerts to prompt appropriate user response and correction.

Figure 3:
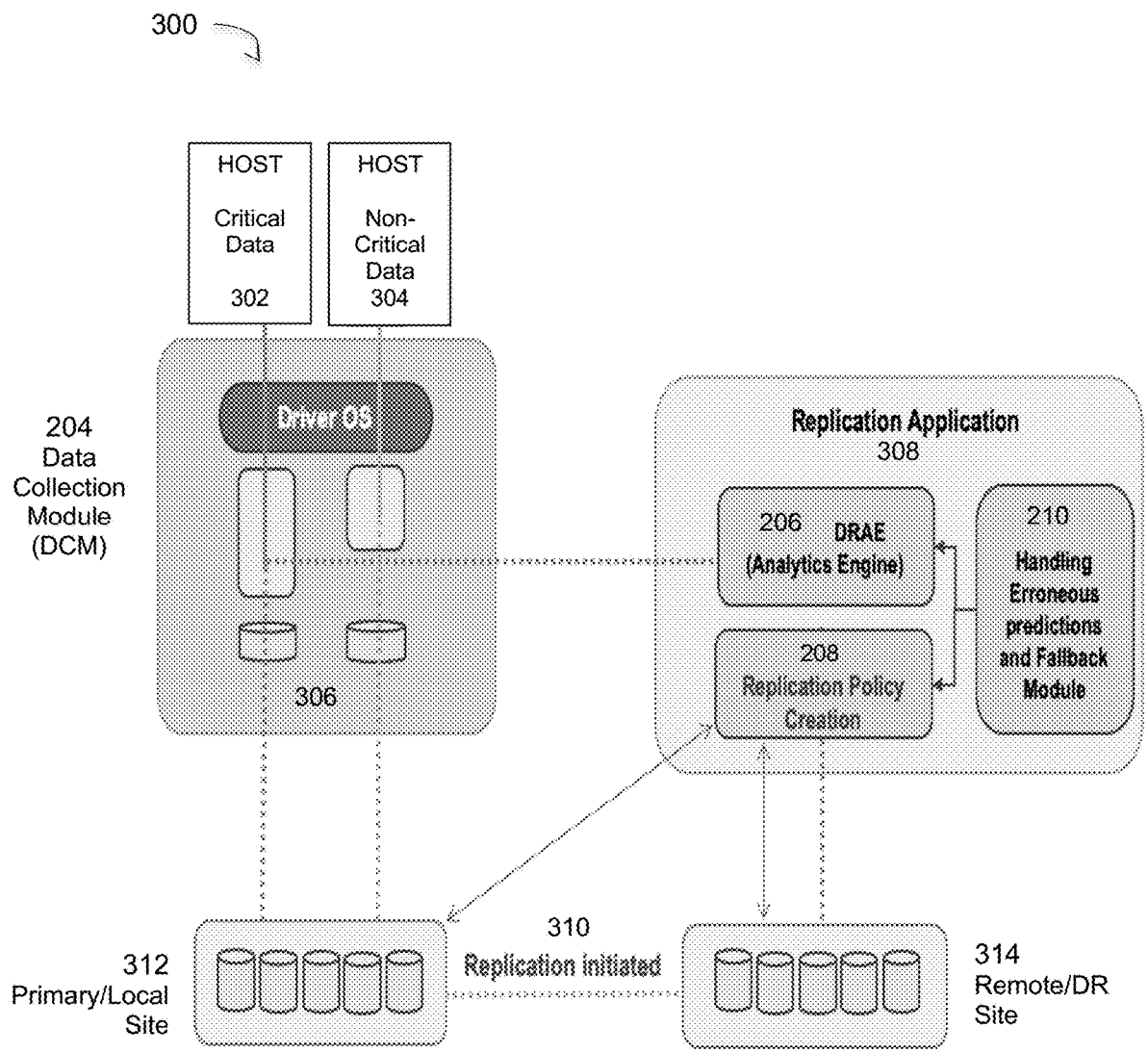
FIG. 3 is a block diagram illustrating the contextual replication manager components in a data replication environment, under some embodiments.

FIG. 3 is a block diagram illustrating the contextual replication manager components of FIG. 2 in a data replication environment, under some embodiments. System 300 of FIG. 3 illustrates an example data replication environment having two hosts generating data for replication. A first host 302 generates critical data while the second host 304 generates non-critical data. This data will be collected, tagged, and stored in accordance with dynamically generated policies produced by the contextual replication manager components DCM 204, DRAE 206, DRPC 208, and error handler 210. For the embodiment of FIG. 3, the data 302 and 303 is provided to a server 306 that comprises the data collection module (DCM) 204. This server may include relevant components such as drivers, buffers, temporary storage, and so on, to pass the data to other components in the system. A replication application 308 is used to move or copy the data 302/304 from primary or local storage 302 to remote or disaster recovery (DR) storage 314 though initiation of a replication operation 310. The data is moved according to certain replication policies that are defined by the dynamic replication policy creator (DRPC) 208 acting on information (e.g., tags) generated by the dynamic replication analytics engine (DRAE) 206. Any errors during this operation are handled by the error handling and fallback module 210.

As shown in FIG. 3, the data (both critical and non-critical) collected by the DCM 204 is passed on to the replication application 308, where the analytics engine 206 identifies and tags the data based on its criticality. Parameters such as server details (e.g., production versus non-production), data type, tenants/projects, cloud environment, storage location, device capabilities, VM priority attributes in a virtualization environment, and so on, are collected, collated, and processed. Also considered are existing server priority subsystem characteristics available for the operating system, such as network parameters (e.g., Cgroup, Windows Priority, QoS, etc.), which are also input to the analytics engine 206. The analytics engine 206 classifies the processed data as either critical or non-critical servers and tags them in the replication application 308. In an embodiment, an Autoregressive Integrated Moving Average (ARIMA) model is used for this process.

To ensure the accuracy of the analytics engine prediction process, a monitoring engine that will continuously keep track of the DRAE 206 and DRPC 208 scheduler, and replication components. In the event where there is a service level agreement (SLA) overshoot or the AI model error percentage increases or any untoward event in the replication, the monitoring engine alerts the replication administrator and takes any necessary action to meet the SLA criteria for the user. The process also provides a custom field that is business-critical/SLA and a project tag that can be manually configured by the replication administrator. This means the administrator has an option to modify the criticality which is tagged by the analytics engine based on the user needs.

The dynamic replication policy creator (DRPC) 208 can be provided as a module in the replication manager console and is used to create or modify the replication policy dynamically based on the criticality identified by analytics engine 206. The Recovery Point Objective (RPO) and Recovery Time Objective (RTO) of the initiated replication operation 310 will be dynamically set by the analytics engine 206 based on the criticality for each server or dataset for server. This replaces the current practice of present systems where the replication profile is created for each and every server manually by the system administrator.

As shown in FIG. 3, the first component receiving the data from hosts or data sources 302 and 304 is the data collection module 204. This component collects the data and parses any extended properties or data attributes of the incoming data. In an virtualized embodiment using hypervisor components (e.g., VMware or similar systems), functionality is added to certain filtering drivers, such as vSphere API's for 10 filtering (VAIO drivers) that are used to write data to the primary site datastore 312 and data replication is performed based on the replication policy. Embodiments of the contextual replication profile creator for data criticality provide enhanced intelligence at the host replication driver to collect the custom data attributes.

In a disaster recovery (DR) environment, there are typically two replication types such as asynchronous, synchronous based on which recovery time objective (RTO) and recovery point objective (RPO) for a user are defined. In synchronous replication, data is written to the primary and secondary site at a time with zero RTO, whereas for asynchronous replication, the data is written to the primary site disk while the data is replicated as per a replication schedule. Users generally prefer synchronous replication method for critical data since the chance of data loss is much less, while asynchronous replication is sufficient for non-critical data. Thus, as shown in FIG. 2, the backup/replication process 212 performs synchronous replication for critical data, and asynchronous replication for non-critical data.

Figure 4:
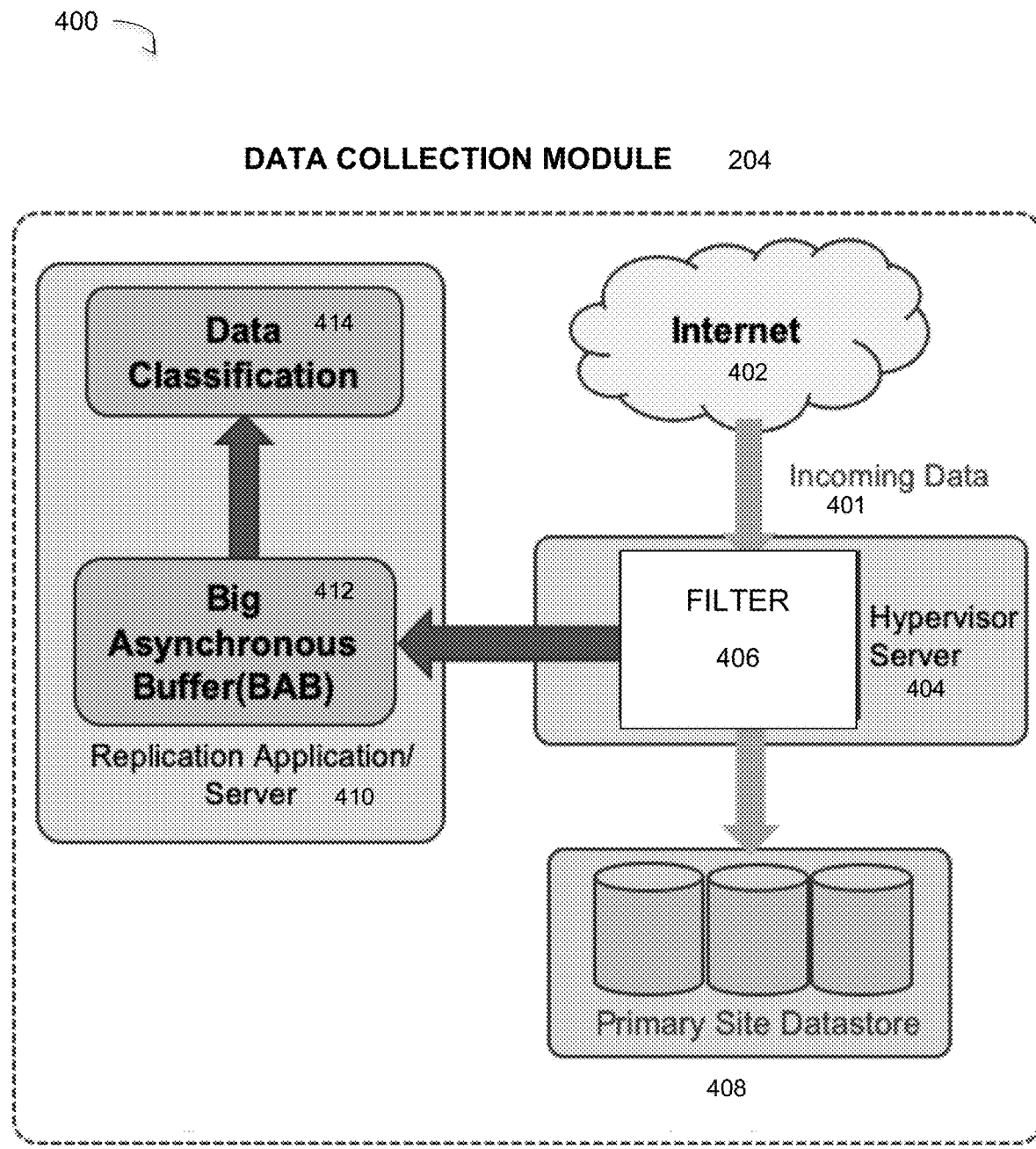
FIG. 4 is a illustrates the workflow of a data collection module, under some embodiments.

FIG. 4 is a diagram 400 illustrating the workflow of a data collection module, under some embodiments. As shown in FIG. 4, operation of the data collection module 204 includes a hypervisor server 404 receiving incoming data 401 from network 402, which can be the Internet, a cloud network, or any other data network. A filter 406, such as a VAIO filter in virtualized systems, receives the incoming data 401 and passes it along to replication server 410 before it is passed on to the primary site datastore 408.

The received data attribute is stored in a buffer, such as a big asynchronous buffer (BAB) 412, and the data gets classified based on the server and application by a data classification module 414. The buffer 412 is an example of a type of storage that is configured by the replication administrator for the data caching purposes. This storage space is used to store the metadata information which comprise the custom data attributes of the incoming data 401. The data classification module 414 in server 410 then filters out the collected data and forwards it to the DRAE 206.

Certain tabulated data attributes can be used the analytics module, and the data attributes are collected based on the data center needs. For example: for a cloud data center environment the data collection module 204 will collect the attributes that are needed for that particular environment. Using the VAIO filter 406, the required data are collected and shared to the replication application for the analytics engine. Although embodiments are described with respect to the use of a VAIO driver for the virtualization environment, embodiments are not so limited, as other replication data contexts may also be used.

The data flow of system 400 does not impose any performance impact or data interruption to existing data center traffic, since it uses a dedicated replication path and replication server system resources to collect and store the data.

Figure 5:
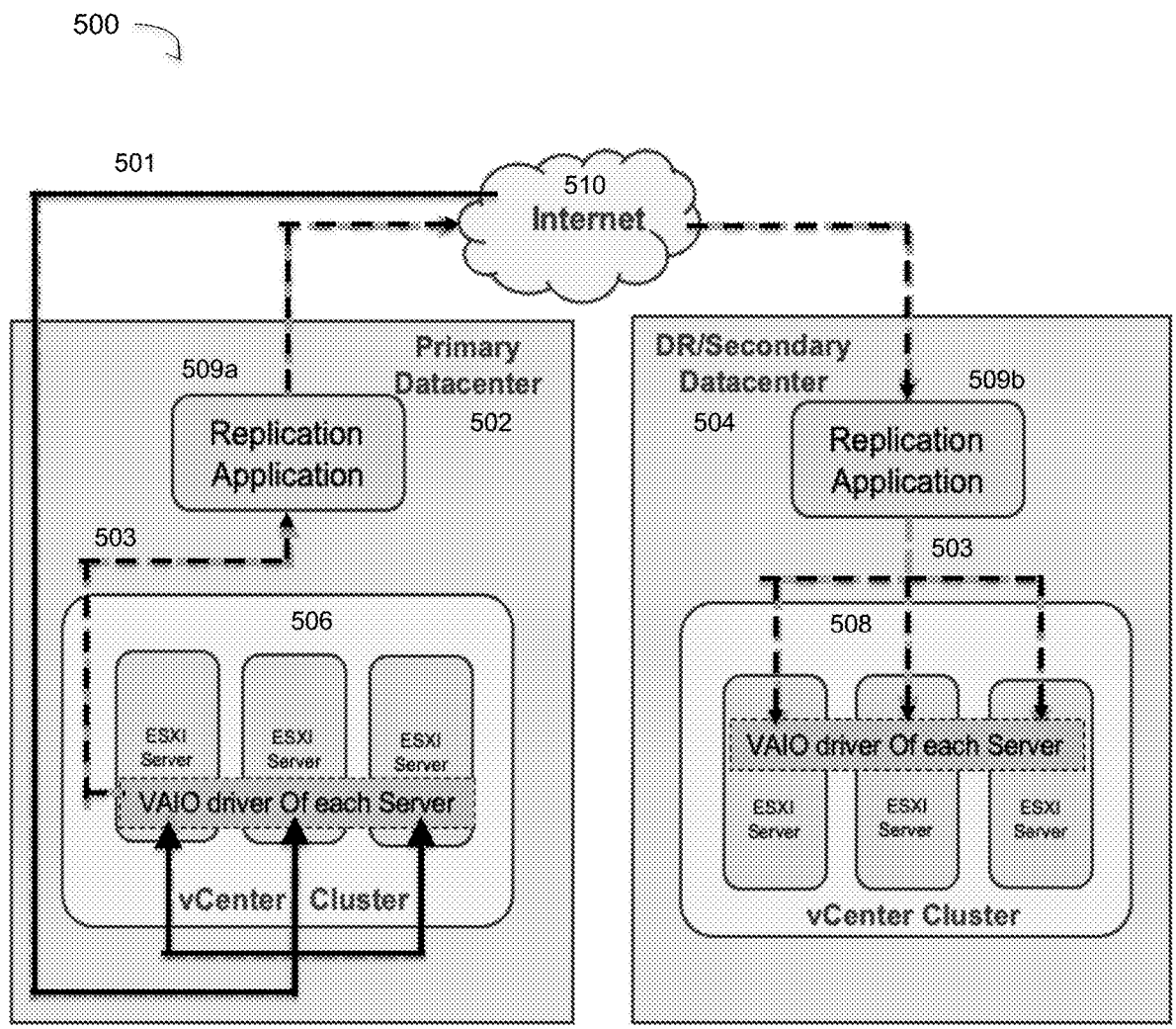
FIG. 5 illustrates a replication process using an example VAIO filter, under some embodiments.

FIG. 5 illustrates a replication process using an example 10 filter in a virtualized environment, under some embodiments. Virtualized environment 500 includes a central network 510 (e.g., Internet) providing data to a primary data center 502 and a secondary (DR) data center 504 that stores replicated data for the primary datacenter 502. The primary data center 502 includes a VM (vCenter) cluster 506 that receives incoming data 501 from the network and produces replicated data 503 from a source replication application 509a. The replicated data 503 is sent over network 510 to the secondary data center 504 where a destination replication application 509b stores the data in appropriate server/storage sites of a vCenter cluster 508 in the secondary data center 504. Each server of the vCenter clusters 506 and 508 have a VAIO (or similar IO) driver.

As shown in FIG. 5, in most virtualized environment data replication processes, the incoming data 501 first gets written into the primary site 502 datastore. The incoming data gets written to the data store using the VAIO driver as an interface. Instead of current manual replication policy management functions for each and every server, as is done by an administrator analyzing the criticality of each server and dataset, embodiments automate this process by dynamically defining policies using certain AI/ML operations and mechanisms. Based on these automated and dynamically defined policies, synchronous or asynchronous replication of the data is performed to the secondary data center site 504. In an embodiment, the VAIO driver filters are configured to read the data attributes and pass this information to the analytics engine 206.

As shown in FIG. 2, the DRAE 206 is an analytics engine that categorizes the data source (VM or server) as critical or non-critical in real time (i.e., as incoming data is received) by analyzing the information collected by the DCM 204. An ARIMA (or similar) time series model to find the criticality of the server on a timely basis and keep the criticality list updated at time intervals. The analytics model derives the criticality of the server using certain data classified information, such as shown in the example table of FIG. 6. As shown in table 600, example data attributes include server type (e.g., production/non-production), data type, tenant and project characteristics, storage location/device capabilities, and VM priority attributes, among others. The table further specifies how data is collected for each attribute, along with any specific notes for the attributes.

This attribution of data based on certain data/device/network characteristics allows the system to automatically factor in specific operating characteristics to help distinguish between critical and non-critical data. In one case, application priority can be configured using network priority that is associated with all traffic originating from the application, For example, certain OS (e.g., Linux) features, such as Cgroup allows control over many system resources. One such feature is the Netprio subsystem that provides a way to dynamically set the priority of network traffic per network interface. Data from such a subsystem can thus be automatically marked as critical.

As another example, the Windows operating system has a feature to apply priority on processes as: Realtime, High, Medium, Low. There are Priority Level IDs set for the type of priority that can be applied and tagged with a certain process. Embodiments use such parameters to derive the server criticality. For this application, an example program code to process priority can be given as follows:
Get-WmiObject Win32 process-filter 'name="ProcessName" ' | foreach-object {$_.SetPriority (PriorityLevelID)}

In an embodiment, the analytics engine 206 uses the parameters, such as shown in table 600 of FIG. 6 to derive a criticality of the server or data source of a given dataset. In general, if any attribute indicates that the data is critical, that data is marked as critical. In other cases, or for load balancing, resource conservation, and so on, or certain combinatorial rules may be used to determined criticality of less than all attributes indicate data as critical. For example, a weighted function may be used to combine the attributes and determine overall criticality of data sources relative to one another. Another attributes example includes application processes, traffic originating from application (e.g., Cgroup), and so on. There can also be certain lists of pods on the container levels like Kubernetes, dockers on container environments, and so on. A user can also make a definition of these data attributes in their datacenter, if they have their own logical grouping/definition with custom applications.

In an embodiment, a customizable input field can be used by a user to manually set the criticality of a data source. This allows an administrator to modify the criticality of data source that has been tagged by the analytics engine based on the user needs. Such a mechanism can be used to elevate a non-critical data source to critical, or mark a critical data source down to non-critical.

FIG. 7 illustrates a flow process for the analytics engine 206, under some embodiments. As shown in FIG. 204, the analytics engine 206 receives data collected from the DCM 204 into a data classifier and filter component 702. An ARIMA (or similar) time series model 712 is then used to find the criticality of the data source at a particular point in time. Criticality can change over time based on many factors and system states, and the time series model implements real time processing of data criticality. The ARIMA (or similar) time series model is used to determine the criticality of the server on a timely basis and keep the criticality list updated at defined time intervals.

The time series model output is then input to a criticality analyzer 704 which sets the server criticality 706. The analytics engine 206 tags 708 the servers/VM/Data with "CRITICAL" "NON-CRITICAL" markers in the replication application database on a timely basis. Such tagging can be done by appending metadata with an appropriate binary flag or text element, as appropriate. Such criticality tagging is the process of setting the criticality of the servers or data sources that are part of the replication application source endpoints. The analytics engine can handle the addition of new servers that are added as part of a replication datacenter and will adapt to derive the solution at that specific time. In an embodiment, a trained model 710 is generated using the tagged data to provide input to AI/ML processes that are used to further automate the process and provide predictive functionality for future replication processes.

Figure 8:
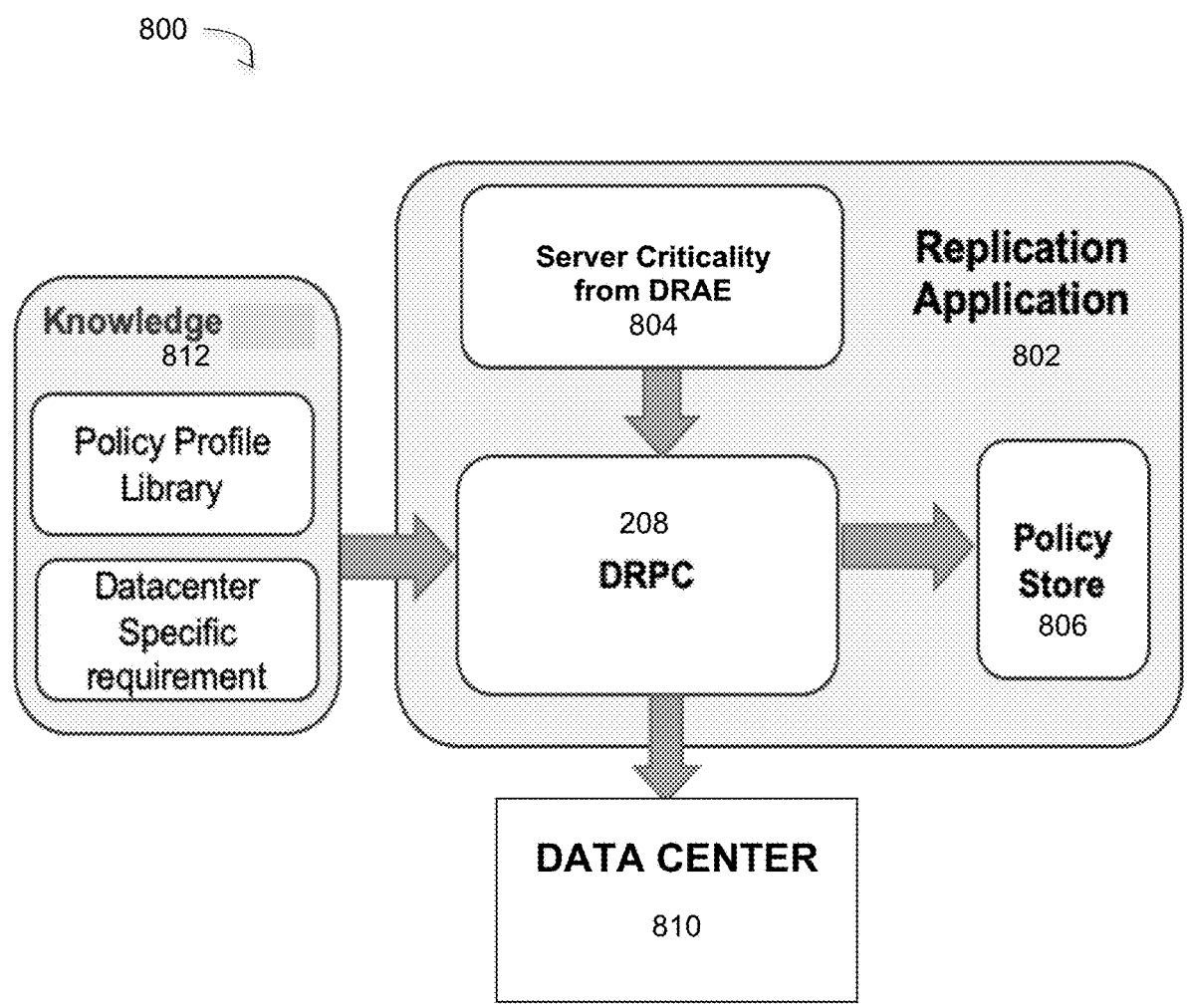
FIG. 8 illustrates an operation of the replication policy creator, under some embodiments.

As shown in FIG. 3, the tagged data from the analytics engine 206 is next input to a replication policy creator DRPC 208. FIG. 8 illustrates an operation of the replication policy creator, under some embodiments. As shown in FIG. 8, the DRPC 208 creates the replication policy based on the server criticality information 804, which is configured at the replication application 802 by DRAE 206, The replication administrator may have an option to modify the criticality of the servers.

System 800 also includes a knowledge component 812 that comprises a policy profile library that has all the reference profiles and properties of all the replication options available, including storage, network, replication type, and so on, as well as data center specific requirement, which stores all the user preferences which are specific to data centers like application and configuration, and access details, etc.

The DRPC generates new or modified policies and stores them in policy store 806, which is a module that stored created replication profiles for future reference. Current policies are then used to store move data among data centers 810 according to the criticality of the data as determined by the DRAE 206.

The DRPC 208 is thus responsible for creating or modifying the replication policy dynamically based on the real time server criticality. This component will also manage different policies of asynchronous replications by managing, scheduling and tasking asynchronous replication operations. To achieve this, it communicates to the local storage site to trigger synchronization operations based on the replication policy needs.

With respect to error handling module 210, the system will continuously keep track of the DRAE 206, DRPC 208 scheduler, replication components and their predictions. In the event when there is an SLA overshoot for any of the replication host priority predictions, alerts will be generated for the replication administrator to take the necessary action to meet the SLA criteria of the customer. For every prediction model there is a percentage of accuracy as well as an error percentage. When an AI/ML regression model is used with the prediction and the DRAE/DRPC applied logic for the runtime, a case of a SLA overshoot means that the prediction could have been missed (i.e., the prediction could have an error and percentage of accuracy would be low). In this case, either the replication policy is corrected or rolled back to a traditional method. The whole process is continuously monitored with a closed control system so that the data is meaningfully replicated from source to target.

In cases where the replication administrator does not take any action within the time period, the whole replication model switches to a synchronous type backup with Zero RTO/RPO. This will help ensure that there is no disaster or any customer SLA breach at any point in time to provide robustness and accuracy since the data is more secure in the event of any failure of the AI calculation or analytics. If the AI solution is not reliable, the percentage of error that is part of the AI model calculation will have an offset which will be allowed and monitored.

As stated above, the tagging of data as critical or non-critical is used by the system to determine the backup method used for the data. In general, and as shown in FIG. 2, critical data is replicated using synchronous (zero RTO) replication, while non-critical data is replicated using asynchronous replication, 212.

The contextual replication manager process can be used in various different use cases. For example, during the first time of replication setup deployment, the server priority and the replication profile has to be configured by the replication administrator only once, and no frequent changes are anticipated so that replication settings are mostly going to be static. Conversely, in a case where the data center might have frequent changes which require the replication policy to be modified and configured often, the user can provide a time interval for the analytics engine to analyze the dynamic changes and create the replication policy for the time interval specified in that run time. This is user configurable and user can create customized time intervals based on specific data needs, such as every 3 or 6 months, etc.

Embodiments thus provide a method to provide contextual and differentiated application-level replication based on the criticality of the server. They dynamically create contextual profiles at runtime based on the server criticality and replicating the data based on these profiles. Methods further identify the critical and non-critical servers and tag them in the replication application using an analytics engine and handle erroneous predictions and fallback mechanism to avoid any customer replication SLA breach at any given time.

The process can be directly integrated into a replication application to overcome disadvantages of current replication applications that do not have an end to end automated method to create and configure the replication policies to the end devices.

As described above, in an embodiment, system 100 processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the net work(s) comprises a computing device capable of executing software code to perform the processing steps described herein.

Figure 9:
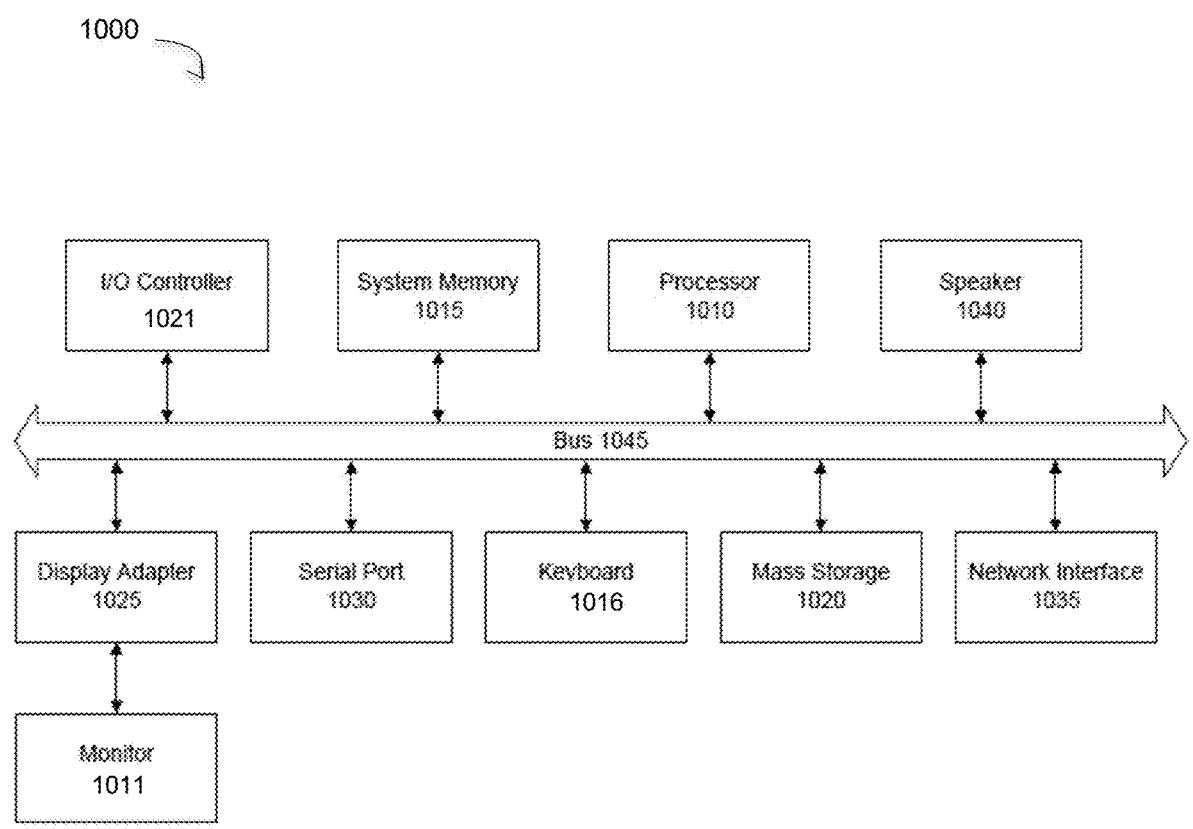
FIG. 9 is a block diagram of a computer system used to execute one or more software components of a system implementing a consistent, differentiated application-level replication service, under some embodiments.

FIG. 9 is a block diagram of a computer system used to execute one or more software components of a system for performing some of the processor-based functions, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is but one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of replicating data using data criticality in a virtualized system, comprising:
    deploying a hypervisor having a virtualization I/O filtering (VAIO) driver to write data to a primary data store;
    collecting, in a data collection module, information about data to be replicated from a data source of a plurality of data sources;
    categorizing, in an analytics engine and in real time, the data source as critical or non-critical as the data is received by analyzing the data collected in the collecting step using a time-series model using data attributes of a server of the data source, and including at least one of: server type, data type, tenant and project characteristics, storage location, device capabilities, and virtual machine priority;
    continuously updating the categorization of the data source at defined time periods based on the time-series model and to meet requirements of a service level agreement (SLA);
    tagging the data source with a current and respective critical or non-critical tag based on the categorizing and updating steps;
    dynamically defining, in a replication policy creator, a replication policy for the data to be replicated based on an updated categorization of the data source and the corresponding tag; and
    replicating, by a backup process, data tagged as critical using synchronous replication and data tagged as non-critical using asynchronous replication, and transmitting the tagged data to the primary data store through the VAIO driver, and wherein VAIO driver comprises filters configured to read data attributes for transmission and processing as the information about the data by the analytics engine.

2. The method of claim 1 wherein the data sources comprise server computers comprising source endpoints in a data storage network performing a replication application.

3. The method of claim 2 wherein the information about the data comprises a plurality of parameters selected from the group consisting of: server type, data type, tenant and project characteristics, storage location and device capabilities, and server priority attributes.

4. The method of claim 3 further comprising allowing a user to directly define a data source as critical or non-critical through a user-defined parameter.

5. The method of claim 4 wherein if any one parameter of the plurality of parameters is considered critical, the server is marked as critical.

6. The method of claim 1 further comprising appending the tag to the data as metadata indicating the criticality of the data source of the data.

7. The method of claim 6 wherein the synchronous replication is used to maintain at least one of a recovery time objective (RTO) or recovery point objective (RPO) of a user SLA for a situation in which asynchronous replication cannot maintain the RTO or RPO.

8. The method of claim 7 wherein the replication policy creator dynamically sets the RTO and RPO through the defined the replication policy based on the criticality of the data source.

9. The method of claim 8 further comprising:
storing the information and tag as a trained model in a trained model storage site; and
using the trained model for one or more machine learning processes generating predictions for future replication operations using the data source.

10. The method of claim 9 further comprising:
monitoring, in an error handling component, the analytics engine, the replication policy creator, and the backup process to identify any SLA overshoot conditions for any generated prediction; and
alerting an administrator of any identified conditions to cause the administrator to take corrective action.

11. A computer-implemented method of defining replication policies using criticality of data sources in a virtualized environment, comprising:
characterizing, in an analytics engine and in real time, a criticality of a data source as critical or non-critical as incoming data is received from the data source based on a plurality of parameters about the data source and data to be replicated from the data source by analyzing the parameters using a time-series model using data attributes of a server of the data source, and including at least one of: server type, data type, tenant and project characteristics, storage location, device capabilities, and virtual machine priority;
continuously updating the categorization of the data source at defined time periods based on the time-series model and to meet requirements of a service level agreement (SLA);
transmitting the data from the data source through a hypervisor having a virtualization I/O filtering (VAIO) driver to write data to a primary data store, wherein VAIO driver comprises filters configured to read data attributes for transmission and processing as the information about the data by an analytics engine performing the characterizing;
tagging the data source with a current and respective critical or non-critical tag based on the characterizing and updating steps;
dynamically defining, in a replication policy creator, a replication policy for the data to be replicated based on an updated categorization of the data source and the corresponding tag; and
performing a replication operation based on the defined replication policy to store the data in a secondary storage site separate from the primary data store.

12. The method of claim 11 wherein if any one parameter of the plurality of parameters is considered critical, the data source is marked as critical, and further comprising appending the tag to the data as metadata indicating the criticality of the data source.

13. The method of claim 12 wherein the synchronous replication is used to maintain at least one of a recovery time objective (RTO) or recovery point objective (RPO) of a user SLA for a situation in which asynchronous replication cannot maintain the RTO or RPO, and further comprising dynamically setting the RTO and RPO through the defined the replication policy based on the criticality of the data source.

14. The method of claim 13 wherein the plurality of parameters is selected from the group consisting of: server type, data type, tenant and project characteristics, storage location and device capabilities, and server priority attributes.

15. The method of claim 14 further comprising:
storing information about the parameters and tag as a trained model in a trained model storage site; and
using the trained model for one or more machine learning processes generating predictions for future replication operations using the primary data store.

16. The method of claim 15 further comprising:
monitoring, in an error handling component, the analytics engine, the replication policy creator, and the backup process to identify any SLA overshoot conditions for any generated prediction; and
alerting an administrator of any identified conditions to cause the administrator to take corrective action.

17. A system for managing metadata for replicating data using data criticality, comprising:
a hypervisor having a virtualization I/O filtering (VAIO) driver to write data to a primary data store;
a data collection module collecting information about data to be replicated from a data source of a plurality of data sources comprising server computers comprising source endpoints in a data storage network performing a replication application;
an analytics engine categorizing, in real time, the data source as critical or non-critical as the data is received by analyzing the data collected in the collecting step using a time-series model using data attributes of a server of the data source, and including at least one of: server type, data type, tenant and project characteristics, storage location, device capabilities, and virtual machine priority, and continuously updating the categorization of the data source at defined time periods based on the time-series model and to meet requirements of a service level agreement (SLA), and further tagging the data source with a current and respective critical or non-critical tag based on the categorizing and updating steps;
a replication policy creator dynamically defining a replication policy for the data to be replicated based on an updated categorization of the data source and the corresponding tag; and
a backup server storing data tagged as critical using synchronous replication and data tagged as non-critical using asynchronous replication in a secondary storage site separate from a primary storage site originally storing the data, and transmitting the tagged data to the primary data store through the VAIO driver, and wherein VAIO driver comprises filters configured to read data attributes for transmission and processing as the information about the data by the analytics engine.

18. The system of claim 17 wherein the information comprises a plurality of parameters selected from the group consisting of: server type, data type, tenant and project characteristics, storage location and device capabilities, and server priority attributes, and wherein if any one parameter of the plurality of parameters is considered critical, the server is marked as critical.

19. The system of claim 18 further comprising appending the tag to the data as metadata indicating the criticality of the data source of the data, and wherein the synchronous replication is used to maintain at least one of a recovery time objective (RTO) or recovery point objective (RPO) of a user SLA for a situation in which asynchronous replication cannot maintain the RTO or RPO, and further wherein the replication policy creator dynamically sets the RTO and RPO through the defined the replication policy based on the criticality of the data source.

20. The system of claim 19 wherein the information and tag are stored as a trained model in a trained model storage site, and the trained model is used for one or more machine learning processes generating predictions for future replication operations using the data source, the system further comprising an error handling component monitoring the analytics engine, the replication policy creator, and the backup process to identify any SLA overshoot conditions for any generated prediction, and alerting an administrator of any identified conditions to cause the administrator to take corrective action.

* * * * *